United States Patent Office 3,766,219
Patented Oct. 16, 1973

3,766,219
FLUORINATED GLYCIDYL ETHERS AND USE THEREOF
Allen G. Pittman, El Cerrito, and William L. Wasley, Berkeley, Calif., assignors to the United States of America as represented by the Secretary of Agriculture
No Drawing. Application July 26, 1967, Ser. No. 666,530, which is a division of application Ser. No. 421,128, Dec. 24, 1964. Divided and this application Jan. 16, 1970, Ser. No. 3,513
The portion of the term of the patent subsequent to Jan. 2, 1985, has been disclaimed
Int. Cl. C07d 1/18
U.S. Cl. 260—348 R      3 Claims

ABSTRACT OF THE DISCLOSURE

Fluoroalkyl glycidyl ethers are prepared by reacting a fluoroketone with an alkali metal fluoride, then reacting the resulting intermediate with an epihalohydrin. Typically, the ketone is hexafluoroacetone whereby the end product is heptafluoroisopropyl glycidyl ether. The glycidyl ethers are useful, in monomeric and especially polymeric form, for imparting water- and oil-repellency to textiles.

---

This is a division of our copending application, Ser. No. 666,530, filed July 26, 1967, now Pat. 3,504,000, which in turn is a division of Ser. No. 421,128, filed Dec. 24, 1964, now Pat. 3,361,685.

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel processes for preparing fluorinated compounds, particularly fluorinated glycidyl ethers and polymers thereof; the provision of the compounds as new compositions of matter; and procedures for treating fibrous materials, especially textiles, with the compounds. Further objects of the invention will be evident from the following description wherein parts and percentages are by weight unless otherwise specified.

The symbol "Gly" is used herein to designate the glycidyl radical:

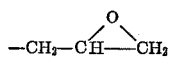

In conventional practice if it is desired to convert a ketone into a glycidyl ether, the following procedure is used: The ketone is reduced to an alcohol and the alcohol is etherified with an epihalohydrin, e.g., epichlorohydrin or epibromohydrin. Thus:

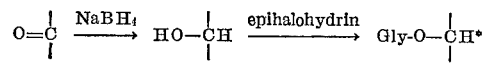

It is to be particularly observed that the conventional procedure requires a reduction step and that the ether product contains a hydrogen atom on the alpha position of the alcohol residue. (This hydrogen atom is indicated above by the asterik.)

In accordance with the invention, fluorinated glycidyl ethers are prepared from ketones. In a first step the ketone is reacted with an alkali metal fluoride to convert the carbonyl radical of the ketone into an alkali metal fluorocarbinolate radical, that is, a fluorocarbinol group wherein the hydrogen of the hydroxyl radical is replaced by alkali metal. Thus:

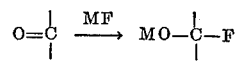

In the above formula M stands for an alkali metal. (Note: No novelty is claimed herein for this first step per se; it is disclosed and claimed in our prior application, Ser. No. 398,129, filed Sept. 21, 1964.)

In a second step, the fluorocarbinolate intermediate is reacted with an epihalohydrin (e.g., epichlorohydrin, epibromohydrin, or epiodohydrin) to form a glycidyl ether, as follows:

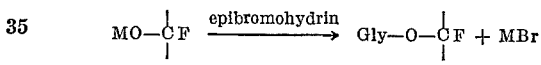

By this simple two-step synthesis, many different kinds of fluorinated glycidyl ethers can be produced in yields as high as 70% of the theoretical. The reactions may be further exemplified by the following formulas, which depict the synthesis of heptafluoroisopropyl glycidyl ether from hexafluoroacetone:

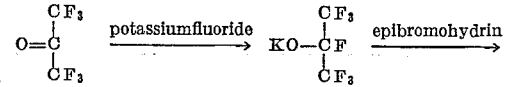

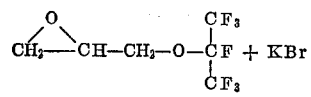

It is evident from the above formulas that the synthesis converts the ketone function to an ether function without requiring the use of a reducing agent and concomitantly a fluorine group is added, that is, the glycidyl ether contains a fluorine group on the alpha carbon atom of the alcohol moiety. This is an unusual and heretofore unknown type of structure which gives the products especially useful properties. For example, the products can be used to provide oil-, water-, and soil-repellent finishes on textiles and the repellency attained is substantially greater than that achieved with the corresponding compounds wherein the same position is occupied by hydrogen.

The process of the invention is by no means limited to the example above but is of great versatility and, generically, can be applied to any aliphatic (one-chain or closed-chain) ketone which contains at least two fluorine groups adjacent to the carbonyl group. In other words, the carbon atoms connected to the carbonyl group must contain at least two fluorine atoms-distributed on these carbon atoms symmetrically or asymmetrically. These fluorine groups are a critical item to activate the carbonyl group so that it will undergo the desired transformation when contacted with the alkali metal fluoride. Especially good results are obtained when the carbon atoms adjacent to the carbonyl radical contain halogen radicals (i.e., F, Cl, Br, or I) in addition to the minimum of two fluorine groups. In this connection it may be noted that although halogens of higher atomic weight than fluorine—i.e., Cl, Br, and I—are not effective by themselves to activate the carbonyl group, they can be employed to supplement the activating influence of fluorine groups. Beyond the positions adjacent to the carbonyl group, the structure of the ketone is of no criticality to the process and available sites may be occupied, for example, by hydrogen or halogen. In other words, the critical item for the process aspect of this invention is that the starting compound contain a carbonyl group activated by adjacent fluorine atoms as explained hereinabove; the remainder of the starting compound is not material to the process. Of course, this remainder may be limited in accordance with certain parameters to provide particular desired characteristics in the glycidyl ether products. However, such limitation concerns the character of the glycidyl ether product, not the operation of the process.

Typical examples of ketones to which the process of the invention may be applied and the corresponding ether products are given below by way of illustration but not limitation. As noted above, the symbol "Gly" stands for the glycidyl radical $$-CH_2-\overset{O}{\overset{\diagup\diagdown}{CH-CH_2-}}$$

| Ketone (starting compound) | Glycidyl ether (product) |
|---|---|
| $CF_3-(CF_2)_n-\overset{O}{\overset{\|}{C}}-(CF_2)_{n'}-CF_3$ | $CF_3-(CF_2)_n-\overset{Gly-O}{\overset{\|}{\underset{F}{C}}}-(CF_2)_{n'}-CF_3$ |

Wherein $n$ and $n'$ are each a number from 0 to 10

| | |
|---|---|
| $(CF_3)_2CF-\overset{O}{\overset{\|}{C}}-CF(CF_3)_2$ | $(CF_3)_2CF-\overset{Gly-O}{\overset{\|}{\underset{F}{C}}}-CF(CF_3)_2$ |

| | |
|---|---|
| $CF_3-(CF_2)_n-\overset{O}{\overset{\|}{C}}-CF(CF_3)_2$ | $CF_3-(CF_2)_n-\overset{Gly-O}{\overset{\|}{\underset{F}{C}}}-CF(CF_3)_2$ |

Wherein $n$ is a number from 0 to 18

| Ketone (starting compound) | Glycidyl ether (product) |
|---|---|
| $R-\overset{O}{\overset{\|}{C}}-CF(CF_3)_2$ | $R-\overset{Gly-O}{\overset{\|}{\underset{F}{C}}}-CF(CF_3)_2$ |

Wherein R represents the heptafluorocyclobutyl radical

| | |
|---|---|
| $O=C\underset{\frown}{(CF_2)_n}$ | $Gly-O-C\underset{\frown}{-F\ (CF_2)_n}$ |

Wherein $n$ is a number from 3 to 10

Compounds Containing Other Halogen Atoms in Addition to Fluorine (Y is Cl, Br, or I)

| | |
|---|---|
| $YCF_2-\overset{O}{\overset{\|}{C}}-CF_3$ | $YCF_2-\overset{Gly-O}{\overset{\|}{\underset{F}{C}}}-CF_3$ |

| | |
|---|---|
| $YCF_2-\overset{O}{\overset{\|}{C}}-CF_2Y$ | $YCF_2-\overset{Gly-O}{\overset{\|}{\underset{F}{C}}}-CF_2Y$ |

| | |
|---|---|
| $Y_2CF-\overset{O}{\overset{\|}{C}}-CF_2Y$ | $Y_2CF-\overset{Gly-O}{\overset{\|}{\underset{F}{C}}}-CF_2Y$ |

| | |
|---|---|
| $Y_2CF-\overset{O}{\overset{\|}{C}}-CFY_2$ | $Y_2CF-\overset{Gly-O}{\overset{\|}{\underset{F}{C}}}-CFY_2$ |

| | |
|---|---|
| $CF_3-(CF_2)_n-\overset{O}{\overset{\|}{C}}-CF_2Y$ | $CF_3-(CF_2)_n-\overset{Gly-O}{\overset{\|}{\underset{F}{C}}}-CF_2Y$ |

Wherein $n$ is a number from 0 to 18

| | |
|---|---|
| $CF_3-(CF_2)_n-\overset{O}{\overset{\|}{C}}-CFY_2$ | $CF_3-(CF_2)_n-\overset{Gly-O}{\overset{\|}{\underset{F}{C}}}-CFY_2$ |

Wherein $n$ is a number from 0 to 18

Compounds Containing Hydrogen in Addition to Fluorine ($n$ and $n'$ are each a number from 1 to 18)

| | |
|---|---|
| $H(CF_2)_n-\overset{O}{\overset{\|}{C}}-(CF_2)_{n'}H$ | $H(CF_2)_n-\overset{Gly-O}{\overset{\|}{\underset{F}{C}}}-(CF_2)_{n'}H$ |

| | |
|---|---|
| $H(CF_2)_n-\overset{O}{\overset{\|}{C}}-(CF_2)_{n'}F$ | $H(CF_2)_n-\overset{Gly-O}{\overset{\|}{\underset{F}{C}}}-(CF_2)_{n'}F$ |

| | |
|---|---|
| $H(CF_2)_n-\overset{O}{\overset{\|}{C}}-CF(CF_3)_2$ | $H(CF_2)_n-\overset{Gly-O}{\overset{\|}{\underset{F}{C}}}-CF(CF_3)_2$ |

| | |
|---|---|
| $R-\overset{O}{\overset{\|}{C}}-C_nF_{2n+1}$ | $R-\overset{Gly-O}{\overset{\|}{\underset{F}{C}}}-C_nF_{2n+1}$ |

Wherein R represents an alkyl group containing 1 to 18 carbon atoms or a cycloalkyl group such as cyclopropyl, cyclobutyl, or cyclohexyl It is also within the broad scope of the invention to utilize, as the starting material, ketones containing more than one carbonyl group. By adjustment of the proportions of reactants in line with usual stoichiometrical relationships, diethers are produced. Typical in this category are the following:

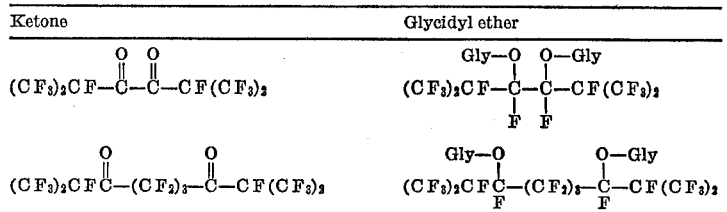

Generically, a preferred class of ketones which may be used in the process of the invention and the intermediates and the glycidyl ethers formed therefrom may be represented by the following structures:

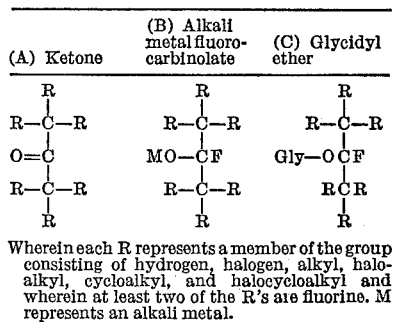

Wherein each R represents a member of the group consisting of hydrogen, halogen, alkyl, haloalkyl, cycloalkyl, and halocycloalkyl and wherein at least two of the R's are fluorine. M represents an alkali metal.

The glycidyl ethers responding to the structure given above in Column C are new compounds, not heretofore prepared or described. Another group of new compounds are the cyclic glycidyl ethers, e.g., those responding to the formula

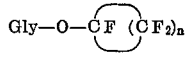

where $n$ is a number from 3 to 10, which may be prepared from the corresponding cyclic ketones

Particularly preferred for treating fibrous materials, e.g., textiles, are the glycidyl ethers of the structure shown below and the polymers derived from these ethers:

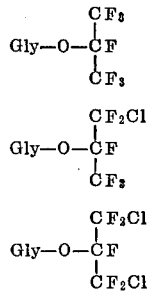

As noted above, in the first step of the synthesis the fluoroketone is reacted with an alkali metal fluoride. As the latter reagent, potassium fluoride is generally preferred, but the fluorides of sodium, cesium, and rubidium may also be used. The reaction is generally conducted in an inert solvent for the ketone, for example, acetonitrile, dioxane, tetrahydrofuran, tetramethylene sulphone, diglyme (an abbreviated name for dimethyl ether of diethylene glycol), etc. The alkali metal fluoride is only slightly soluble in these solvents and the disappearance of undispersed alkali metal fluoride during the reaction supplies a useful indication of formation of the desired intermediate (which is soluble). The temperature of reaction is not critical. Generally, temperatures over 35° C. are avoided to prevent decomposition of the intermediate. Usually, the reaction is conducted at room temperature for convenience but it does take place at much lower temperatures. Where the starting ketone is a gas (for example, hexafluoroacetone) it is preferred to cool the system first to get the ketone into solution. Then, the temperature can be increased—for example, allowed to warm to room temperature—to accelerate the reaction. To prevent hydrolysis of the intermediate, the reaction is conducted under anhydrous conditions. It is also helpful to remove air (which may contain moisture) by flushing the reaction vessel with dry, inert gas such as nitrogen. When the intermediate is formed—as evidenced by disappearance of undissolved alkali metal fluoride—the system is ready for further treatment. Generally, the intermediate is not isolated but is employed just as it is formed. The etherification is accomplished simply by adding the epihalohydrin (i.e., epichlorohydrin, epibromohydrin, or epiiodohydrin) to the reaction system containing the intermediate and stirring the mixture. The temperature at which the etherification is conducted is not a critical factor and may vary, for example, from 20 to 100° C. Generally, the higher temperatures in this range, namely about 50 to 100° C., are preferred to increase the rate of reaction.

The glycidyl ether is recovered from the reaction system in the following manner: The precipitated inorganic halide (for example, potassium bromide where the reactants are epibromohydrin and a potassium fluorocarbinolate) is removed and water is added to the reaction mixture. The organic phase containing the glycidyl ether is removed from the aqueous phase and is then dried and the product separated by distillation. In the alternative, the reaction mixture may be filtered to remove alkali metal salt and the product isolated by distillation.

The glycidyl ethers produced in accordance with the invention may be used in many areas wherein epoxides in general are employed, e.g., as intermediates in reactions involving the oxirane ring. Moreover, the glycidyl ethers are polymerizable and can be formed into homopolymers or copolymers by standard techniques used in the polymerization of epoxides. Homopolymers can be produced, for example, by mixing the glycidyl ether with a catalytic quantity of a Lewis acid such as boron trifluoride or ferric chloride or boron trifluoride-etherate. Copolymers can be produced by applying the same procedure to a mixture of the glycidyl ether plus a different epoxide monomer such as ethylene oxide, propylene oxide, epichlorohydrin, phenyl glycidyl ether, styrene oxide, or the like. High molecular weight, solid polymers can be obtained by heating the monomers at 70–80° C. with a small amount of a diethyl zinc/water catalyst system. These polymers are highly elastic materials which are useful in the preparation of rubbers which are to be used at extremes of low and high temperatures and/or under conditions where resistance to ordinary solvents is required. They can be employed in such applications as coating and as adhesives in laminating sheet materials. Of special interest is that these high molecular weight, solid polymers exhibit low solubility in common solvents such as benzene, toluene, xylene, etc., whereas they are soluble in fluorinated solvents such as benzotrifluoride, 1,3-bis-trifluoromethyl benzene, and the like. Thus, the polymers in question can be used in coating and adhesive applications where other polymeric materials are unsuitable because of solubility in common organic solvents.

A particular phase of the present invention is concerned with the treatment of fibrous materials, such as textiles, in order to improve their properties, e.g., to improve their oil-, water-, and soil-repellency. In practicing this phase of the invention, a glycidyl ether is prepared as hereinabove described and is applied to the fibrous material, using either of two procedures. In one procedure, the monomeric glycidyl ether is applied to the fibrous material and polymerized in situ thereon by applying a conventional epoxide polymerization catalyst such as an acidic or basic catalyst system (HCl, BF₃, triethylamine, etc.) This procedure can lead to a polymer which is grafted to the fiber molecules when the fibrous material contains groups such as carboxyl, hydroxyl, or amino which react with and form covalent linkages by reaction with the oxirane ring systems. Typical of such fibrous materials are wool, viscose rayons, cotton, paper, and the like. In a typical application of this procedure, the fibrous substrate such as wool cloth is padded through a methanol solution containing 5 to 40% of the glycidyl ether and 10% (based on weight of the glycidyl ether) of zinc fluoborate catalyst to an 80–100% wet pick-up. The fabric is then dried and cured for 5–10 minutes at 100–125° C. In a preferred embodiment of the invention, the glycidyl ether is first polymerized and then applied to the fibrous material. The polymer may be a homopolymer, that is, one consisting of recurring units of the glycidyl ether, or it may be a copolymer, that is, a polymer containing recurring units of the glycidyl ether interspersed with units derived from a different epoxide monomer, such as styrene oxide, propylene oxide, ethylene oxide, epichlorohydrin, phenyl glycidyl ether and the like. The polymers are prepared by conventional techniques. For example, the glycidyl ether per se or admixed with a different epoxide monomer is heated at about 70–80° C. in the presence of a small amount of diethyl zinc/water. As illustrative examples of this procedure, when heptafluoroisopropyl glycidyl ether is formed into a homopolymer, the product is a polymer containing in its skeletal chain recurring units of the structure:

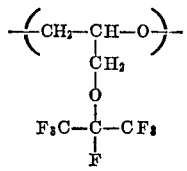

In the event that the same glycidyl ether is copolymerized with propylene oxide, for example, the copolymer product contains in its skeletal chain recurring units of the above type plus recurring units derived from propylene oxide, i.e.

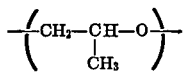

In any event, the polymers (homo- or co-polymers) are applied to the fibrous material in conventional manner. Typically, the polymer is dissolved in an inert, volatile solvent—for example, benzotrifluoride or 1,3-bis-trifluoromethyl benzene—and the resulting solution applied to the fibrous material by a conventional dip and pad technique. By varying the concentration of polymer in solution and the degree of padding, the amount of polymer deposited on the material may be varied. Typically, the amount of polymer may be about from 0.1 to 20%, based on the weight of fibrous material but it is obvious that higher or lower proportions can be used if desired. Usually, in treating textiles such as fabrics the amount of polymer is limited to about 0.1 to 10% to attain the desired repellency improvement without interference with the hand of the textile. Generally, it is preferred to subject the fibrous material to a conventional curing operation after application of the polymer solution thereto in order to bond the polymer to the fibers. As an example of such treatment, the fibrous material is heated to the range of about 50 to 150° C. for a period of about 5 to 30 minutes. The solvent (from the polymer solution) may be evaporated in a separate step prior to curing or may be simply evaporated during the curing operation. In an alternative procedure, the polymers are applied to the fibrous material in the form of an aqueous solution, then curing is applied. Fibrous materials treated with the polymers of the invention display an increased resistance to becoming soiled because they repel both water- and oil-borne soils and stains. Moreover, the improvements so rendered are durable—they are retained despite laundering and dry-cleaning of the product. Especially good results (durability of the imparted repellency) are attained where the fibrous material contains groups such as hydroxyl, carboxyl, amino, etc. (as is the case with wool, cotton, viscose rayons, and other hydrogen-donor fibers) whereby the applied polymer is chemically bonded (grafted) to the fiber molecules.

The invention may be utilized for improving the properties of all types of fibrous materials, for example, paper; cotton; linen; hemp; jute; ramie; sisal; cellulose acetate rayons; cellulose acetate-butyrate rayons; saponified acetate rayons; viscose rayons; cuprammonium rayons; ethyl cellulose; fibers prepared from amylose, algins, or pectins; wool; silk; animal hair; mohair; leather; fur; regenerated protein fibers prepared from casein, soybean, peanut proteins, zein, gluten, egg albumin, collagen, or keratins; nylon; polyurethane fibers; polyester fibers such as polyethylene terephthalate; polyacrylonitrile-based fibers; or fibers of inorganic origin such as asbestos, glass, etc. The invention may be applied to textile materials which are in the form of bulk fibers, filaments, yarns, threads, slivers, roving, top, webbing, cord, tape, woven or knitted fabrics, felts or other non-woven fabrics, garments or garment parts.

EXAMPLES

The invention is further demonstrated by the following illustrative examples. The various tests described in the examples were carried out as described below:

Oil repellency: The 3M oil repellency test described by Grajeck and Petersen. Textile Research Journal, 32, pages 320–331, 1962. Ratings are from 0 to 150, with the higher values signifying the greater resistance to oil penetration.

Water repellency: AATC spray test, method 22–1952. Ratings are from 0 to 100, with the higher values signifying greater resistance to water penetration.

Example I.—Preparation of heptafluoroisopropyl glycidyl ether

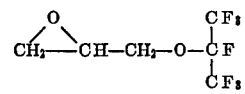

A dry, 250-ml., three-neck flask was fitted with a Dry-Ice reflux condenser, gas-inlet tube, and magnetic stirring bar. Eight and eight-tenths grams (0.15 mole) dry potassium fluoride was placed in the flask, followed by 70 cc. diglyme. This dispersion was cooled to minus 40° C., by applying a Dry-Ice cooling bath to the flask. Twenty-six grams (0.15 mole) of hexafluoroacetone was introduced into the flask. The cooling bath was then removed and the system allowed to come to room temperature. As the system warmed, formation of the fluorocarbinolate intermediate was evidenced by disappearance of the dispersed KF, giving a homogeneous solution.

Then, 20.5 grams (0.15 mole) of epibromohydrin was added in one batch. The Dry-Ice condenser was replaced with a water condenser and the reaction mixture was heated for 10 hours at 80–90° C. The solid precipitate of potassium bromide (30 g.) was then removed by filtration and the filtrate poured into 200 cc. of cold water. The lower (fluorocarbon) layer was removed and washed three times with 50-cc. portions of water. Thirty grams (80% yield) of crude product was obtained. This product was purified by fractional distillation, yielding 18 grams of the pure glycidyl ether, B.P. 117–118° C. at 760 mm.; $N_D^{20}$ 1.3169.

Calculated for $C_6F_7H_5O_2$ (percent): C, 29.75%; F, 54.96; H, 2.06. Found (percent): C, 29.69; F, 54.87; H, 2.01. Calculated M.W. 242. Found (HBr titration): 240. The infrared and NMR spectra were in accordance with the structure given above.

Example II.—Preparation of β-chlorohexafluoroisopropyl glycidyl ether $$CH_2\underset{O}{-}CH-CH_2-O-\underset{\underset{CF_3}{|}}{\overset{\overset{CF_2Cl}{|}}{C}}F$$

Using the procedure described in Example I, the following materials were applied to the reaction:

Cesium fluoride _____grams__ 22.8
Diglyme (solvent) _____cc__ 70
Monochloropentafluoroacetone _____grams__ 29
Epibromohydrin _____do___ 20.5

The glycidyl ether was obtained in a 62% yield, B.P. 139.5–140° C./760 mm., $N_D^{23}$ 1.3634.

Example III.—Preparation of β,β′-dichloropentafluoroisopropyl glycidyl ether $$CH_2\underset{O}{-}CH-CH_2-O-\underset{\underset{CF_2Cl}{|}}{\overset{\overset{CF_2Cl}{|}}{C}}F$$

Using the procedure described in Example I, the following materials were applied to the reaction:

Potassium fluoride _____grams__ 5.9
Diglyme (solvent) _____cc__ 70
Sym.-dichlorotetrafluoroacetone _____grams__ 27
Epibromohydrin _____do___ 13.7

The glycidyl ether was obtained in a yield of 66%, B.P. 170–172° C./760 mm.

Example IV.—Polymerization of heptafluoroisopropyl glycidyl ether with diethyl zinc/$H_2O$ A 7-mm. (inner diameter) Pyrex glass tubing, sealed at one end was placed on a manifold system and evacuated. The glass tube was placed in a Dry-Ice-acetone bath and 1.5 gm. of heptafluoroisopropyl glycidyl ether was introduced followed by $4 \times 10^{-4}$ mole of water, $6 \times 10^{-4}$ mole of diethyl zinc and finally 1-cc. of dry cyclohexane. The glass tubing was then melt sealed, positioned on a wrist-action shaker and heated at 70° C. in a water bath for 20 hours. The solid polymer plug was removed from the tube and heated in a vacuum oven at 80° C. for 24 hours to remove residual solvent and monomer. An 80% conversion to a highly elastic solid polymer had been obtained. A 1% solution of the polymer in benzotrifluoride gave an inherent viscosity of 0.5 at 25° C. Differential thermal analysis (DTA) of the polymer revealed an endothermic reaction at ca. −43° C. which presumably is the glass transition temperature and thermal decomposition beginning about 270° C.

Solubility of the polymer was tested by placing a small amount of polymer in a screw cap vial containing solvent and shaking for 15 hours at 25° C. Under these conditions the polymer readily dissolved in benzotrifluoride but did not dissolve or appear to swell in benzene, p-dioxane or N,N-dimethylformamide.

Example V.—Polymerization of heptafluoroisopropyl glycidyl ether with $BF_3$-etherate Ten parts of heptafluoroisopropyl glycidyl ether was placed in a glass tube and cooled in a Dry Ice-acetone bath. Then, one part of boron trifluoride etherate was added and the tube sealed and allowed to warm to ambient temperature. As the system reached room temperature it was observed that a vigorous exothermic reaction was taking place. The system was heated for 20 hours at 70° C. and the product subjected to vacuum to remove residual monomer boron trifluoride and ether. The product was a viscous liquid polymer, obtained in an amount representing ca. 60% conversion of the monomer to polymer. It was soluble in a wide variety of organic solvents, including acetone, toluene, dimethylformamide, diglyme, etc.

Example VI.—Polymerization of β-chlorohexafluoroisopropyl glycidyl ether

This glycidyl ether polymerized in the same manner as described in Examples IV and V. For instance, a sealed tube polymerization of β-chlorohexafluoroisopropyl glycidyl ether using 10% $BF_3$/diethyl ether as catalyst gave a 72% conversion to a viscous liquid polymer soluble in a wide range of organic solvents.

Example VII.—Application of poly-(heptafluoroisopropyl glycidyl ether to wool fabric The elastomeric solid polymer described in Example IV was dissolved in benzotrifluoride. Solutions containing from 0.4 to 10% of the polymer were prepared. Wool swatches were immersed in the polymer solution, squeezed to obtain ca. 100% wet pick-up, dried and cured at 105° C. for 15 minutes. Oil and water repellency ratings are given below for the treated fabrics:

| Wt. percent of resin on fabric | Oil repellency rating | Water repellency rating |
| --- | --- | --- |
| 10 | 110 | 100 |
| 5 | 90 | 100 |
| 2.5 | 80 | 100 |
| 1.7 | 60 | 100 |
| 0.8 | 60 | 100 |
| 0.4 | 60 | 100 |
| Control, untreated | 0 | 50 |

Having thus described the invention, we claim:

1. A process for preparing a glycidyl ether which comprises:
   (a) dispersing an alkali metal fluoride in an anhydrous inert solvent for the ketone desscribed below,
   (b) cooling the dispersion to a temperature not above 35° C.,
   (c) adding to the cooled dispersion a ketone of the structure $$\underset{\underset{CF_3}{|}}{\overset{\overset{CF_3}{|}}{C}}=O$$

(d) warming the resulting reaction mixture to about room temperature,
   (e) without isolating the so-formed intermediate, adding to the reaction mixture an epihalohydrin selected from the group consisting of epichlorohydrin, epibromohydrin, and epiiodohydrin,
   (f) stirring the reaction mixture at a temperature of about 50 to 100° C., and
   (g) recovering the so-produced glycidyl ether having the structure $$CH_2\underset{O}{-}CH-CH_2-O-\underset{\underset{CF_3}{|}}{\overset{\overset{CF_3}{|}}{C}}F$$

2. A process for preparing a glycidyl ether which comprises:
   (a) dispersing an alkali metal fluoride in an anhydrous inert solvent for the ketone described below,
   (b) cooling the dispersion to a temperature not above 35° C.,
   (c) adding to the cooled dispersion a ketone of the structure $$\underset{\underset{CF_3}{|}}{\overset{\overset{CH_2Cl}{|}}{C}}=O$$

(d) warming the resulting reaction mixture to about room temperature,
(e) without isolating the so-formed intermediate, adding to the reaction mixture an epihalohydrin selected from the group consisting of epichlorohydrin, epibromohydrin, and epiiodohydrin,
(f) stirring the reaction mixture at a temperature of about 50 to 100° C., and
(g) recovering the so-produced glycidyl ether having the structure

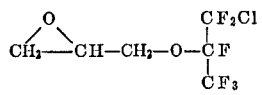

$$\underset{\diagdown\!\diagup}{\overset{O}{\phantom{x}}}$$
$$CH_2\!\!-\!\!CH\!-\!CH_2\!-\!O\!-\!\underset{\underset{CF_3}{|}}{\overset{\overset{CF_2Cl}{|}}{C}}F$$

3. A process for preparing a glycidyl ether which comprises:
(a) dispersing an alkali metal fluoride in an anhydrous inert solvent for the ketone described below,
(b) cooling the dispersion to a temperature not above 35° C.,
(c) adding to the cooled dispersion a ketone of the structure

$$\underset{\underset{CF_2Cl}{|}}{\overset{\overset{CF_2Cl}{|}}{C}}\!\!=\!\!O$$

(d) warming the resulting reaction mixture to about room temperature,
(e) without isolating the so-formed intermediate, adding to the reaction mixture an epihalohydrin selected from the group consisting of epichlorohydrin, epibromohydrin, and epiiodohydrin,
(f) stirring the reaction mixture at a temperature of about 50 to 100° C., and
(g) recovering the so-produced glycidyl ether having the structure

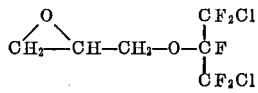

$$CH_2\!\!-\!\!CH\!-\!CH_2\!-\!O\!-\!\underset{\underset{CF_2Cl}{|}}{\overset{\overset{CF_2Cl}{|}}{C}}F$$

References Cited
UNITED STATES PATENTS
3,504,000   3/1970   Pittman et al. _____ 260—348

NORMA S. MILESTONE, Primary Examiner